T. F. BARSBY.
EXTENSIBLE DRIVING SHAFT FOR AUTOMOBILES.
APPLICATION FILED AUG. 15, 1916.
1,276,710.
Patented Aug. 27, 1918.
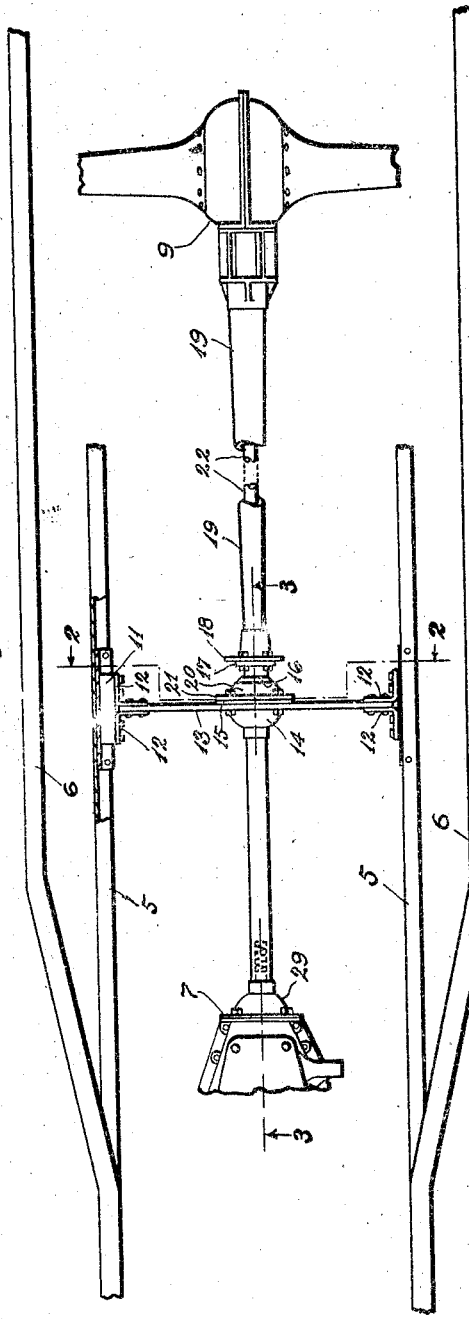
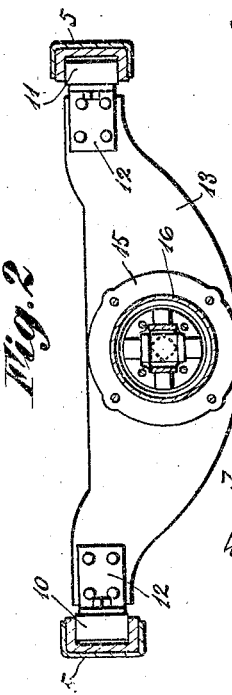
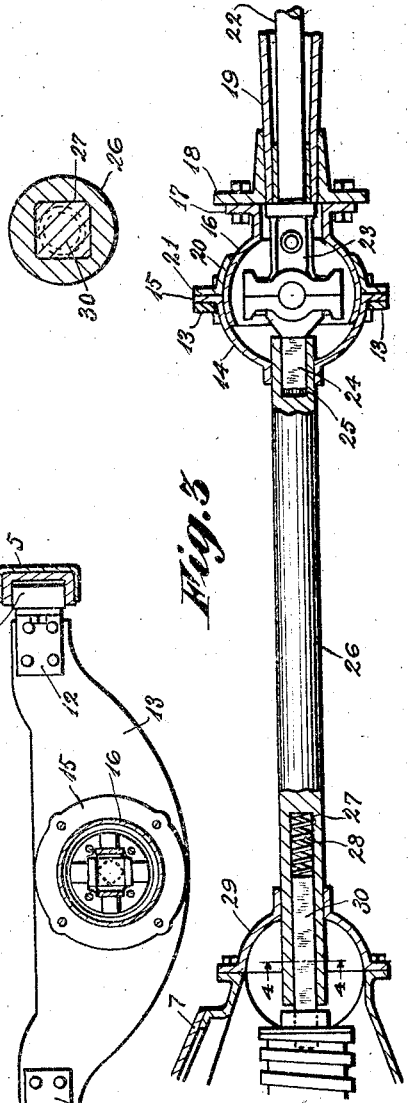
INVENTOR
Thomas Fredrick Barsby
BY
C. D. Haskins
ATTORNEY

UNITED STATES PATENT OFFICE.

THOMAS FREDRICK BARSBY, OF SEATTLE, WASHINGTON, ASSIGNOR, BY MESNE ASSIGN-
MENTS, TO UNIVERSITY GARAGE COMPANY, OF SEATTLE, WASHINGTON, A CORPO-
RATION.

EXTENSIBLE DRIVING-SHAFT FOR AUTOMOBILES.

1,276,710.  Specification of Letters Patent.  Patented Aug. 27, 1918.

Application filed August 15, 1916. Serial No. 115,084.

*To all whom it may concern:*

Be it known that I, THOMAS FREDRICK BARSBY, citizen of the United States, residing at Seattle, in the county of King and State of Washington, have invented a certain new and useful Improvement in Extensible Driving-Shafts for Automobiles, of which the following is a specification.

My invention relates to improvements in extensible driving shafts for automobiles, and the object of my invention is to provide a driving shaft which shall include an extensible section in association with a universal joint, and which shall be adapted to connect the engine of an automobile with the differential gearing of the rearward axle of said automobile.

And, a further object of my invention is to provide an extensible driving shaft that shall be particularly adapted to facilitate the operation of converting a passenger automobile into an automobile truck by making changes which include an addition to the length of the chassis of said passenger automobile.

I accomplish these objects by devices illustrated in the accompanying drawings wherein Figure 1 is a plan view representing associated parts of an automobile truck that has been converted from a passenger automobile, which parts embody my invention; Fig. 2 is an enlarged view of parts of the same, in vertical cross-section on broken line 2, 2 of Fig. 1; Fig. 3 is an enlarged view of other parts of the same in vertical mid-section on broken line 3, 3 of Fig. 1; and Fig. 4 is an enlarged view of parts of the same in vertical cross-section on broken line 4, 4 of Fig. 3.

Referring to the drawings, throughout which like reference numerals indicate like parts, 5 and 5 designate the original opposite side rails of the chassis of a common type of passenger automobile that is now converted into an automobile truck by fastening to said side rails 5 and 5 the longer side rails 6 and 6, to give greater length to the chassis of said automobile truck, and by making other changes not shown.

The numeral 7 designates the transmission mechanism associated with the rearward portion of an engine, not shown, and 9 designates the housing which contains the differential gearing (not shown) that is associated with the rearward axle (not shown) of the automobile truck.

The side rails 5 and 5 are made of channeled iron bars and are disposed with their channeled sides facing each other, and within the channel of each of said side rails 5 and 5 is a block, as blocks 10 and 11, which fits therein to adapt it to be slidingly moved backward and forward, said blocks 10 and 11 being disposed directly opposite each other.

Fastened to the opposite faces of the blocks 10 and 11 by means of angular brackets 12 are the opposite end portions of a cross-bar 13, made of iron or steel plate to have the form shown in Fig. 3, and extending through the central portion of said cross-bar 13 is a large circular hole through which extends forwardly the fixed half 14 of a hollow spherical housing, which fixed half 14 is provided with a flange 15 that is fastened to the rearward side of said cross-bar 13.

The movable half 16 of said spherical housing is of a smaller diameter and is disposed with a portion of it within the fixed half 14 to project rearwardly therefrom to connect its flanged open end 17 with the flanged end 18 of a tubular shaft housing 19; and said movable half 16 is maintained in its articulated position by a collar 20 that is provided with a flange 21 which is bolted to the flange 15 and cross-bar 13, as shown more clearly in Fig. 3.

Thus, the movable half 16, to which the shaft housing 19 is connected, permits said shaft housing 19 swingingly to rise and fall in response to like movements of the differential gear housing with which it is connected as indicated in Fig. 1.

Connected to the differential gearing within the housing 9 is one end portion of a section 22 of the driving shaft whose other end portion is connected to one end 23 of a universal joint, of well known form, that is within the spherical housing formed by the fixed half 14 and the movable half 16, the other end 24 of which is of square cross-section and slidably projects into a square hole 25 that is formed in the rearward end portion of another section 26 of said driving shaft which slidably projects into the forward opening of the fixed half 14 of the spherical housing, as shown more clearly in Fig. 3.

The forward end portion of said section 26 of said driving shaft is also provided with a hole 27, of square cross-section, within the innermost portion of which is a helical compression spring 28, and within the outer end portion of which is slidably disposed a square rod 30 which projects outwardly therefrom, and said forward end portion of said section 26 is disposed to project through a cover 29, where said square rod 30 slidably projects into a square hole formed in a rotatable part of the transmission mechanism 7, as shown in Fig. 3.

Thus, any longitudinal movement of the section 22 of the driving shaft and its shaft housing 19, due to traveling over uneven roads, may move the cross-bar 13 forward and backward, thereby varying the distance between said cross-bar 13 and the square rod 30 of the transmission mechanism 7, without cramping, or interfering with the rotation of the driving shaft, since the opposite end portions of its section 26 may slidingly move on the squared end 24 of the universal joint and on the square rod 30, the spring 28 serving to keep said section 26 in its rearwardmost position to prevent said section 26 from making a rattling noise during the operation of the automobile truck.

Obviously, the length of the section 26 of the driving shaft may be changed to suit automobiles of different lengths of "wheelbase" and changes may be made in the forms, dimensions and arrangement of other associated parts of my invention without departing from the spirit thereof.

What I claim is;

1. An extensible driving shaft for an automobile, which embodies two sections; a universal joint to one end of which is rigidly connected one end of one of said sections, and to the other end of which universal joint is slidably connected one end portion of the other one of said sections, thereby to be independently movable in endwise directions with respect to said universal joint; a housing within which said universal joint is disposed, said housing comprising a rigidly supported portion to which is articulated a movable portion thereof; a tubular shaft housing connected to said movable portion of the said housing that contains said universal joint, and within which shaft housing is disposed one of said sections; and means adapted to make a resiliently and slidable connection between said independently movable section and the transmission mechanism of said automobile.

2. The combination with the transmission and differential mechanism of a motor vehicle, of a two-part shaft including a universal joint at their adjacent ends, one of the shaft sections being movable in a direction parallel to the longitudinal axis thereof and one end of the longitudinally movable shaft having a slidable engagement with the universal joint while the other end thereof has resilient engagement with the transmission shaft.

3. The combination with the transmission and differential mechanism of a motor vehicle, of a two-part shaft including a universal joint at their adjacent ends, one of the shaft sections being movable in a direction parallel to the longitudinal axis thereof and a hanger for supporting the universal joint extending transversely of the vehicle and having its ends slidably supported in the side bars of the vehicle chassis.

4. An extensible driving shaft for automobiles including two sections having a universal joint at their adjacent ends, means for supporting the universal joint in a manner to permit free longitudinal movement thereof relative to the vehicle chassis and one of the shaft sections having a cushioned sliding engagement with the driving mechanism.

5. An extensible driving shaft for automobiles including two sections having a universal joint at their adjacent ends, means for supporting the universal joint in a manner to permit free longitudinal movement thereof relative to the vehicle chassis, one of the shaft sections having a cushioned sliding engagement with the driving mechanism and a freely extensible connection with the universal joint.

In witness whereof, I, hereunto subscribe my name this 7th day of August, A. D., 1916.

THOMAS FREDRICK BARSBY.

Witnesses:
    FRANK WARREN,
    O. JOHNSON.